Patented Apr. 28, 1931

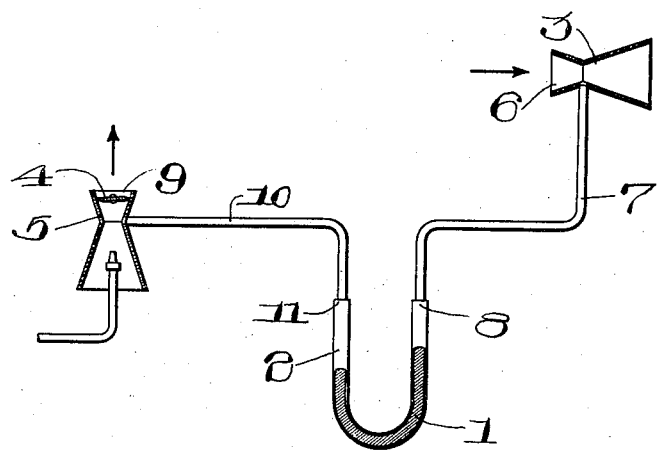

1,803,260

UNITED STATES PATENT OFFICE

RENNOSUKE KONDO, OF TOKYO, JAPAN

APPARATUS FOR INDICATING WHETHER SUCTION QUANTITY IN AN INTERNAL-COMBUSTION ENGINE IS PROPER

Application filed April 3, 1928, Serial No. 266,987, and in Japan December 27, 1927.

This invention relates to an apparatus for indicating whether the quantity of the mixture of gaseous fuel and air supplied to a cylinder or cylinders of an engine is proper or not, in internal combustion engines which are mounted on travelling bodies such as motor-vehicles and aircrafts. This apparatus consists of a pressure gauge which indicates the difference of two pressures, a Venturi tube fixed to the said travelling body having both ends open forwards and backwards, another Venturi tube connected in one end to the suction pipe of the engine, and pipes connecting the middle parts of said Venturi tubes to two mouths of the said pressure gauge, respectively. The object of this invention is to provide an apparatus which enables the operator to find at a glance during the operation of the engine whether the quantity of supplied fuel gas is proper or not with regard to the travelling speed of the engine.

The accompanying drawing shows an example of the apparatus embodying this invention diagrammatically.

This apparatus consists of a pressure gauge 2 for indicating the difference of two pressures, for example a manometer which consists of a U-shaped tube containing mercury 1, a Venturi tube 3 for flow of air to pass through as the engine travels and a Venturi tube 5 connected with a suction pipe of the engine and provided with a valve 4 for regulating suction quantity. The mouth 6 of the tube 3 opens towards the direction of the travelling of travelling bodies such as motor vehicles and aircrafts. The narrow part of the tube is connected by the pipe 7 with one of the mouths 8 of the said pressure gauge 2. The tube 5 has one end 9 to be connected with the suction pipe of the engine, the other end communicating with the mixture supplying source such as a carbureter. The narrow part of the tube is connected by the pipe 10 with the other mouth 11 of the said pressure gauge.

In this apparatus, when travelling bodies such as motor vehicles or aircrafts provided with the engine run, air flows through the Venturi tube in the direction indicated by an arrow, producing low pressure at the narrow part of the tube. This pressure varies according to the velocity of the flow of air and is applied to the end 8 of the pressure gauge 2. In the Venturi tube 5, the flow of the combustible mixture will be produced owing to the suction of the engine in the direction as indicated by an arrow, and consequently low pressure is formed in the narrow part of the tube. This pressure is applied to the end 11 of the pressure gauge 2 and varies according to the regulation of the valve 4.

As described above, the pressure gauge 2 indicates the change of a relation between the travelling speed of the engine and the suction quantity of the mixture. Therefore, if the ratio of suction quantities giving the maximum efficiency against the various travelling speeds is pre-determined, it is possible to find at a glance during the operation whether the suction quantity is too big or too small. Thus, as in this invention it is possible to know by the pressure gauge whether the quantity of the supplied mixture is proper or not and to regulate the quantity by the valve 4, the engine can be operated with high efficiency.

The speed of an airplane or automobile in relation to the suction quantity of an engine is determined by suitable means and is diagrammatized in many curves according to the state of advancing, that is to say, according to the ascending or descending at various angles. These diagrams, if put before the operator and compared with the suction quantity indicated by the device, will show that the quantity is adequate to that state of advancing.

I claim:

Apparatus for indicating whether suction quantity in an internal combustion engine is proper or not, consisting of a pressure gauge for indicating the difference of two pressures, having two mouths, a Venturi tube fixed to the engine and having its mouth open forward in the direction of the travelling of the engine and another Venturi tube connected with the suction pipe of the engine and the means for connecting the throat part of each of the said tubes with each of the two mouths of the said pressure gauge.

In testimony whereof I have affixed my signature.

RENNOSUKE KONDO.